United States Patent [19]

Davis et al.

[11] Patent Number: 5,592,518
[45] Date of Patent: Jan. 7, 1997

[54] PARALLEL FRAME SYNCHRONIZER FOR DETECTING FORWARD-ORDERED/REVERSE-ORDERED, INVERTED/NON-INVERTED DATA

[75] Inventors: Richard M. Davis, Littleton; Thad J. Genrich, Aurora; Mark W. Hall, Franktown, all of Colo.

[73] Assignee: Hughes Electronics, Los Angeles, Calif.

[21] Appl. No.: 219,695

[22] Filed: Mar. 28, 1994

[51] Int. Cl.⁶ ................................................... H04L 7/00
[52] U.S. Cl. .......................... 375/368; 375/366; 375/354; 370/509
[58] Field of Search ..................... 375/368, 365, 375/362, 364, 366, 354, 355, 371, 372; 370/105.1, 100.1, 102, 105.4, 106

[56] References Cited

U.S. PATENT DOCUMENTS

| | | |
|---|---|---|
| 4,298,987 | 11/1981 | Stattel et al. ........................... 375/106 |
| 4,748,623 | 5/1988 | Fujimoto . |
| 4,907,186 | 3/1990 | Racey ........................................ 364/900 |
| 4,920,535 | 4/1990 | Watanabe et al. .................... 370/105.1 |
| 4,920,546 | 4/1990 | Iguchi et al. . |
| 5,058,141 | 10/1991 | Kem et al. . |
| 5,081,654 | 1/1992 | Stephenson et al. . |
| 5,140,618 | 8/1992 | Kinoshita et al. . |

*Primary Examiner*—Edward L. Coles, Sr.
*Assistant Examiner*—Allan A. Esposo
*Attorney, Agent, or Firm*—Michael W. Sales; Wanda K. Denson-Low

[57] ABSTRACT

A high speed parallel frame synchronizer provides high speed frame synchronization functions utilizing parallel processing techniques implemented with commercially available components. Serial input data is demultiplexed to an N bit wide word at a rate of 1/N of the input clock frequency. A total of N parallel correlators are used to detect the frame synchronization pattern. Outputs of the correlators are arbitrated using a priority encoder which provides synchronization information to the frame synchronizer. One embodiment of this invention utilizes 4N correlators to simultaneously provide for synchronization of true/inverted and forward/reverse data generated by real-time or playback data sources.

18 Claims, 7 Drawing Sheets

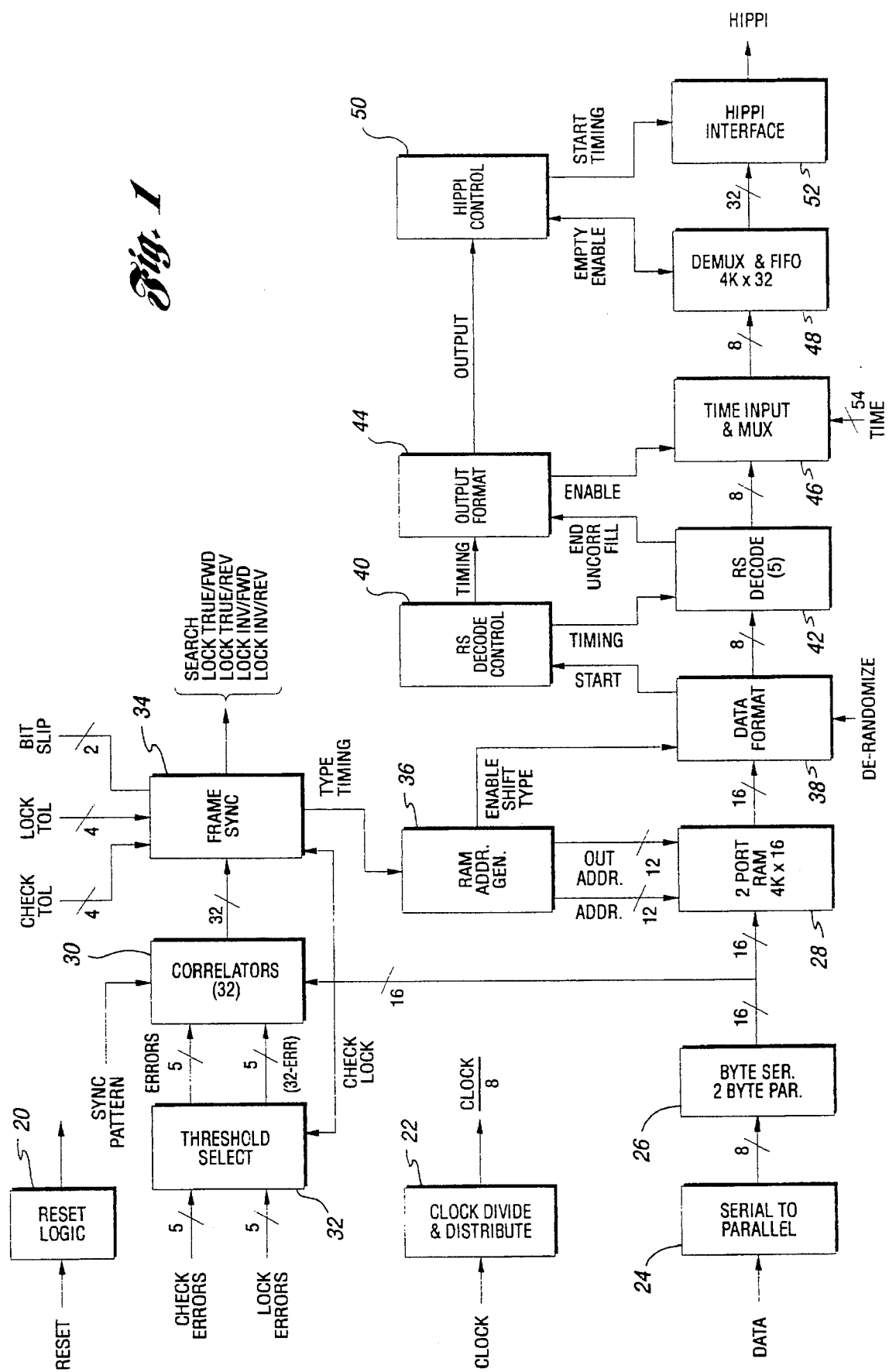

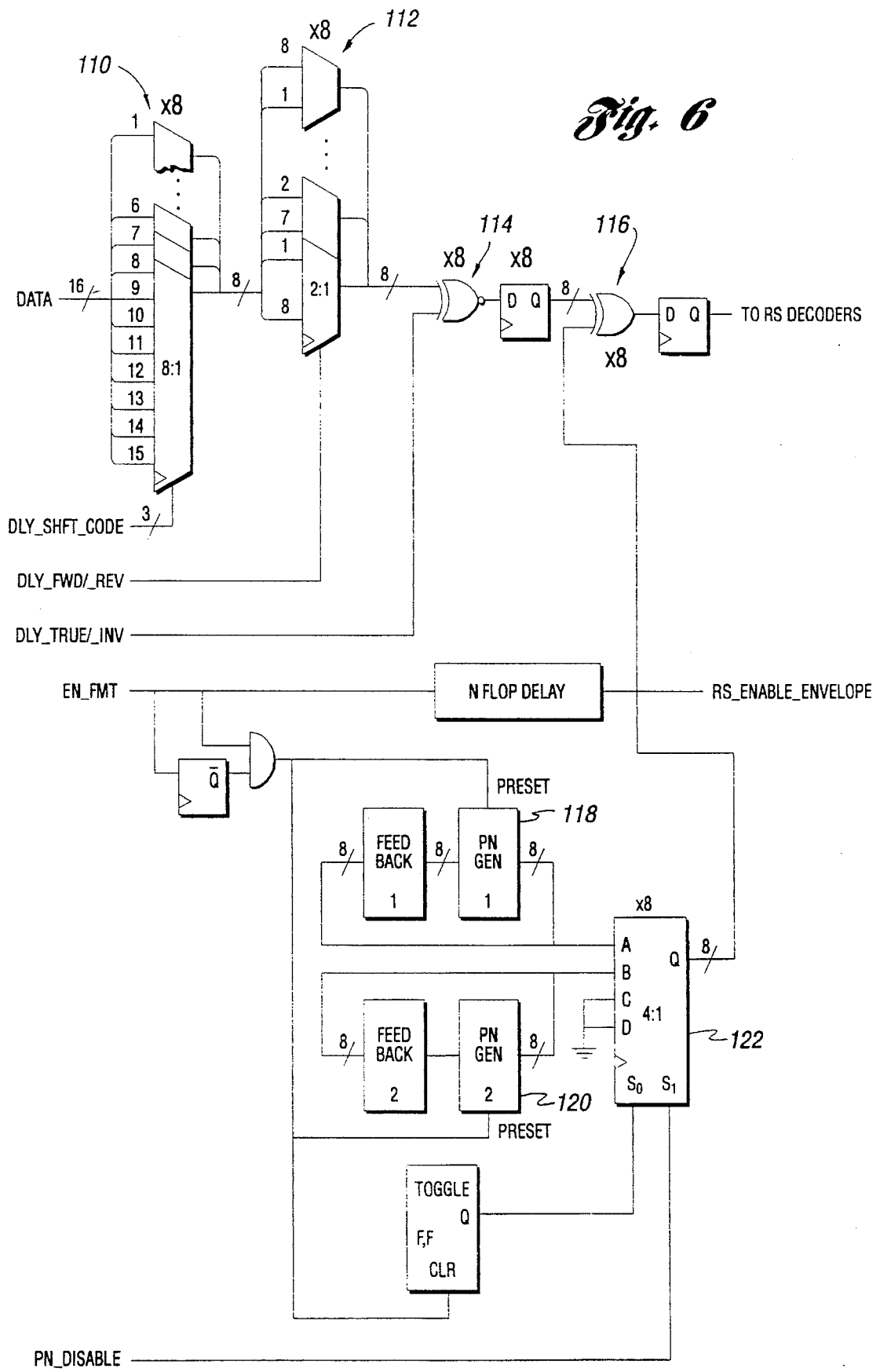

PARALLEL FRAME SYNCHRONIZER FOR DETECTING FORWARD-ORDERED/REVERSE-ORDERED, INVERTED/NON-INVERTED DATA

TECHNICAL FIELD

The present invention relates to a system for identifying a frame synchronizing signal present in a high speed serial data signal to synchronize a receiver of the system with a transmitter.

BACKGROUND ART

A frame synchronizer detects a periodic synchronization pattern present in a serial data stream so as to identify the beginning of a data frame. Within each data frame are a number of data words which each consist of a predetermined number of data bits. Typically, a data word contains eight bits. The synchronization pattern may be contained within a single data word or may consist of a number of sequential data words. Detection of the synchronization pattern involves matching the predetermined pattern to a substantially similar (so as to allow for errors) or identical group of bits in the incoming data stream.

The continuing evolution of integrated electronic components and advances in data communication technology have enabled faster and faster data communication rates. High speed data communication applications, including fiber optic communication systems and space data communication systems (such as satellite communications), may operate at rates exceeding 1 Gigabit/second (Gbps). Specialized electronics are often utilized to meet the demands of such high speed applications. Emitter coupled logic (ECL) components may be utilized although they are more expensive and have a higher power consumption than complimentary metal oxide silicon (CMOS) components. However, CMOS components are typically not fast enough to accommodate these high speed communication applications.

Another possible implementation of high speed data communication electronics utilizes application specific integrated circuits (ASIC's) which typically employ gallium arsenide (GaAs) technology. These specialized electronic circuits require significant design and development time and are very expensive to manufacture. Thus, it would be desirable to employ standard CMOS components to implement a high speed frame synchronizer due to their relatively low cost, common availability and low power consumption.

Space data communication systems have unique design considerations. Efforts are taken to minimize power consumption by transmitting equipment since space systems often utilize solar power. Often, data is captured and recorded by a satellite data recorder utilizing magnetic tape reels and is not transmitted until some later time to an Earth ground station. The data is then transmitted in reverse order so that the tape reel does not have to be rewound. Thus, a frame synchronizer located at the ground station must detect reverse data for proper synchronization.

A frame synchronizer used in space data communications must also detect forward data which is transmitted in real-time as it is captured. Furthermore, the system should be capable of detecting inverted or true data signals. Inverted data signals may result from a phase shift in the received data signal since the demodulator at the receiver may lock in a true or inverted state relative to the transmitter.

High speed data communication requires efficient and reliable fault detection and correction techniques, especially when data is transmitted in real time, since retransmission may be difficult or impossible. A number of factors may be responsible for various data errors which may occur. These errors include random errors as well as burst errors. One such factor in space data communications is the considerable distance which the data must travel through the atmosphere before arriving at the ground station receiver. Therefore, it is desirable for a frame synchronizer to tolerate a number of errors without losing synchronization, while also correcting any errors which may be present.

Typical frame synchronizers have a number of operating modes. These may include a "hunt" or "search" mode which attempts to identify the synchronization pattern in the incoming data stream as well as a "Lock" mode and a "Check" or "Verify" mode. Once the synchronization pattern has been identified (with some certainty) the synchronizer enters the Verify mode and looks to the next frame to see that the pattern has indeed been located. If the pattern does not occur where it is anticipated then the system returns to Search mode. Sometimes, the pattern may be shifted by a bit from its anticipated position at the beginning of the frame. This is known as a bit slip. It is desirable for a frame synchronizer to be able to tolerate some bit slips so that synchronization is not easily lost.

DISCLOSURE OF THE INVENTION

It is, therefore, an object of the present invention to provide a frame synchronizer system for automatically synchronizing to high speed serial true or inverted data.

Another object of the present invention is to provide a system for automatically synchronizing to high speed serial forward data produced by a real-time data source.

Still another object of the present invention is to provide a system for automatically synchronizing to high speed reverse data produced by a playback data source.

Yet another object of the present invention is to provide a system for high speed frame synchronization which utilizes standard components to ensure long term availability of low cost replacement parts.

An additional object of the present invention is to provide a system for frame synchronization capable of operating at a data rate of at least 300 Mbps.

Still another object of the present invention is to provide a system for high speed frame synchronization which incorporates a low component count resulting in reduced power consumption and high reliability.

Yet another object of the present invention is to provide a system for high speed frame synchronization which tolerates a variable number of bit errors without losing synchronization.

A further object of the present invention is to provide a system for high speed frame synchronization which tolerates bit slips without losing synchronization.

In carrying out the above object and other objects and features of the present invention, a frame synchronizer system is provided for detecting a predetermined frame synchronization pattern within a received digital signal which is characterized by a serial bit stream. A predetermined number of consecutive bits in the serial bit stream is converted to a parallel data word as the digital signal is received. The system includes comparators for substantially simultaneously comparing each parallel data word with a number of predetermined parallel bit patterns. Each bit pattern corresponds to a different representation of the frame synchronization pattern which provides for characterization of the digital signal being received and provides for determination of the position of the frame synchronization pattern within the parallel data word. The digital signal is characterized as either true forward, true reverse, inverted forward, or inverted reverse. The system includes a number of correlators for generating a signal for each comparison to indicate a degree of correlation between the bit patterns and at least a portion of the parallel data word. The system also includes a synchronizer for selecting an appropriate correlation signal which indicates detection of the predetermined frame synchronization pattern.

A method is also provided for use with the system of the present invention and other similar systems which detect a pattern for frame synchronization.

The above objects and other objects, features, and advantages of the present invention will be readily appreciated by one of ordinary skill in the art from the following-detailed-description of the best mode for carrying out the invention when taken in connection with the accompanying drawings.

BRIEF DESCRIPTION OF THE DRAWINGS

FIG. 1 is block diagram of a high speed parallel frame synchronizer according to the present invention;

FIG. 6 is a block diagram illustrating the components of the data format block of the high speed parallel frame synchronizer of FIG. 1 according to the present invention.

BEST MODE(S) FOR CARRYING OUT THE INVENTION

Figure 2A:
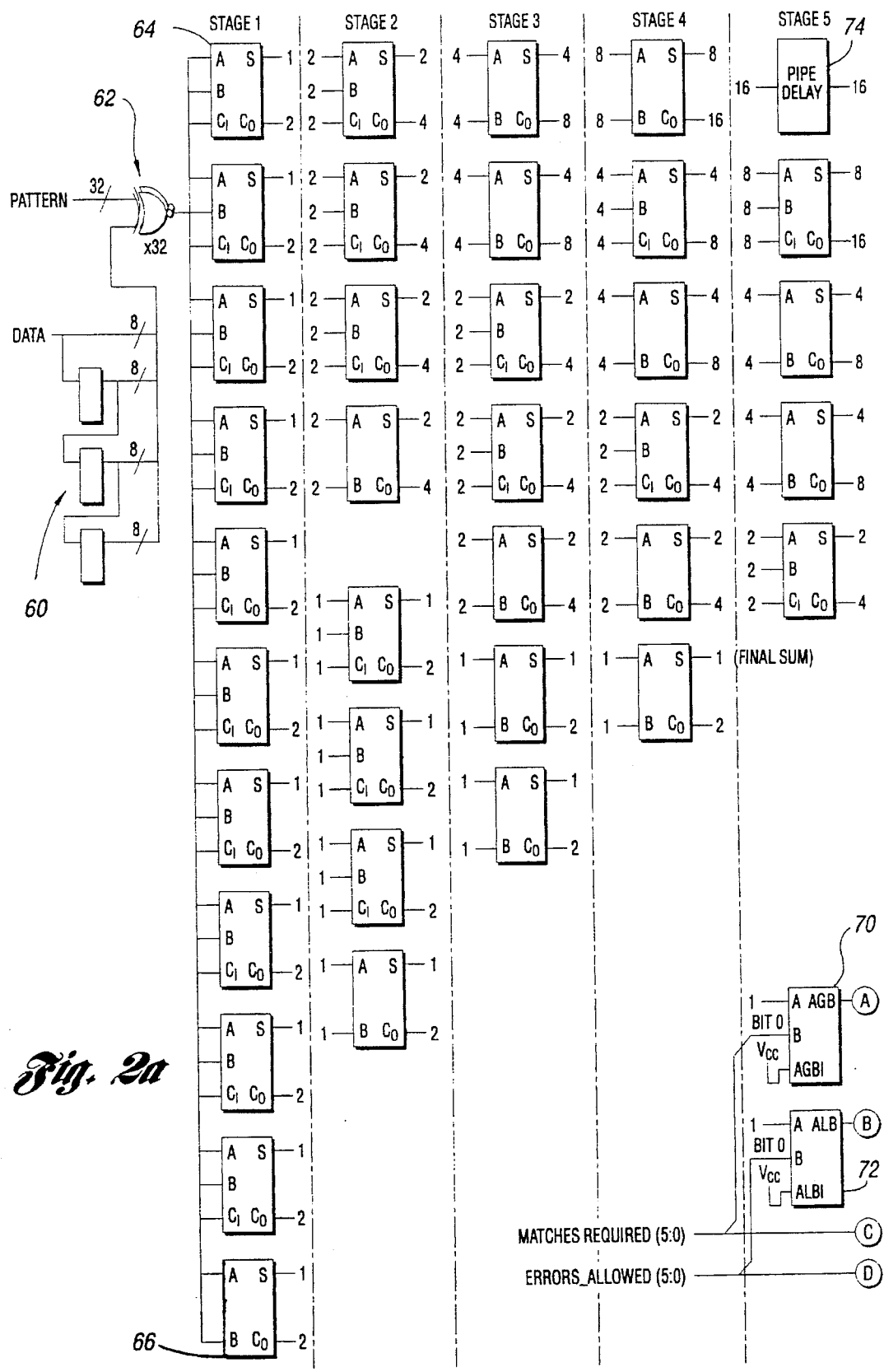
FIGS. 2a and 2b are a block diagram illustrating the components of one of the correlators of the high speed parallel frame synchronizer of FIG. 1 according to the present invention.

Referring now to FIG. 1, a block diagram of a high speed parallel frame synchronizer system according to the present invention is shown. In a preferred embodiment, the system is incorporated into a front-end processor (FEP) which provides frame synchronization in accordance with the regulations promulgated by the Consultive Committee for Space Data Systems (CCSDS). The system accepts received serial link data, which may include random and burst errors, and synchronizes to frame synchronization patterns present in the data. The system also performs Reed-Solomon forward error correction and outputs the corrected data over a High Performance Parallel Interface (HIPPI) to an external high speed computer or other storage device.

Preferably, the synchronization patterns are 32 bits in length, although other patterns could be easily implemented. Similarly, the following description assumes eight-bit data words unless stated otherwise although other delineations are possible without departing from the spirit or scope of the present invention.

As indicated in FIG. 1, reset logic 20 generates reset signals for all illustrated logic blocks which are synchronized with the distributed clock signals produced by clock distributing block 22. A reset signal is generated upon system power up or in response to an operator request.

The input to clock distributing block 22 is preferably a differential signal having a frequency between 0 and 300 Mhz, and a magnitude compatible with ECL logic components which are commonly used in high speed data communication applications. Clock distributing block 22 divides the input clock frequency by a predetermined number and distributes the resultant signal to all other logic blocks. The predetermined number is typically the number of data bits in a data word. A preferred embodiment of the system utilizes eight-bit data words. An undivided input clock signal is also provided to a serial-to-parallel converter block 24.

An incoming serial data stream passes through the system demultiplexor (not shown) and is provided as input data to serial-to-parallel block 24. Typically, this input data is a differential signal having a level compatible with ECL componentry. Block 24 converts the serial input data to eight-bit parallel data words. Parallel output data is ordered such that a more significant bit (higher numbered) was received before a less significant (lower numbered) bit. The parallel output data is then input to block 26.

The byte serial to two byte parallel converter block 26 constructs two-byte wide data words from consecutive input bytes. At the beginning of each Clock/8 cycle, the byte present on the eight least significant output bits is transferred to the eight most significant output bits. The byte present on the input is simultaneously transferred to the eight least significant output bits of the 16 output bits. Thus, only eight new bits of information are present in each two-byte data word since the 8 more significant bits are from the previous clock cycle. The two-byte data word is sent to dual port RAM 28 for storage, and to the correlators 30 for synchronization (sync) pattern detection.

Of course, the necessary size of dual port RAM 28 depends upon the frame length of the particular application since longer frame lengths require a greater amount of RAM for storage. The size of RAM can be adjusted without significantly impacting the system operation. Furthermore, the necessary size of dual port RAM 28 could easily be reduced by a factor of 2 by placing it after block 24 and before block 26.

The system allows a different predetermined number of sync pattern bit errors in the various operating states (explained in greater detail below). Theoretically, the predetermined number may range from zero to 32 bits, but values approaching 32 bits have questionable value in practice. Threshold select block 32 generates the allowable number of sync pattern errors corresponding to the current operating state and communicates this information to the correlators 30. The allowable number of sync pattern matches (32 minus the allowable number of sync pattern errors) is communicated to correlators 30, as well.

The correlators 30 compare the input data stream from block 26 to the predetermined sync pattern and determine whether the number of errors detected exceed the allowable threshold. The system attempts to substantially simultaneously synchronize to any of the four possible combinations of true/inverted and forward/reverse data. Furthermore, the 16-bit input data word contains nine possible 8-bit sequential groupings, each differing by one bit shift. Since the most significant bit (MSB) is not tested, eight groupings remain and are analyzed substantially simultaneously. Thus, 32 correlators (8 groupings×4 combinations) operate simultaneously. As explained in greater detail below, the same functionality can be achieved utilizing only 16 correlators by detecting true/inverted data within the same correlator. Each correlator contains internal shift registers to reconstruct 32 consecutive input bits from the corresponding 8-bit input grouping for comparison to the 32-bit sync pattern. The output signals from the correlators 30 are sent to frame sync block 34.

Frame sync block 34 includes four operating states identified as Search, Check, Lock, and Flywheel. A priority encoder within the frame sync block determines which correlation is recognized if multiple indications are received. In the Search state, a correlation indication causes the frame sync block to enter the Check state. A bit count corresponding to the frame length is then started. Preferably, each frame contains 1279 bytes, or 10,232 bits, to accommodate the sync pattern, Reed-Solomon coding, and data. When the bit count is completed, correlation corresponding to the original data type is checked. If a corresponding correlation is not found, operation reverts to the Search state. This process is repeated a predetermined number of times as indicated by the value of the CHECK_TOL parameter which ranges from 0 to 15 depending upon the particular application.

Once the predetermined number of consecutive frame sync patterns has been received and detected, the operating state changes to the Lock state. The absence of a corresponding frame sync pattern at the anticipated time while in the Lock state causes the frame sync block 34 to enter the Flywheel state. A predetermined number of consecutive frame sync pattern misses are allowed in the Flywheel state before returning to the Search state. This predetermined number is indicated by the value of the LOCK_TOL input to frame sync block 34, which ranges from 0 to 15. If a frame sync pattern is detected while in the Flywheel state, operation returns to the Lock state.

Frame sync block 34 of FIG. 1 also includes a BIT_SLIP input. The bit slip value, which ranges from 0 to 3, determines what the time window measured in bits will be for checking for successive frame sync patterns. For example, if a value of 1 is set, an error of +/−1 bit period is allowed in recognition of the frame sync pattern. For example, a frame sync pattern which is detected after 10,231 bits or 10,233 bits from the previously detected frame sync pattern would be acceptable. Frame sync block 34 provides data type and timing signals to RAM address generator block 36. In addition, frame sync block 34 provides operator status information concerning the currently selected parameters and operating state.

The RAM address generator block 36 produces sequential input addresses for dual port RAM 28. Once a frame has been received, block 36 generates sequential output addresses, starting at the beginning of the received frame. Reversed data is read out in a sequence reversed from the entry sequence to provided a forward ordered output frame. Although the frames themselves are output with an internal forward order, the frame to frame sequence is still reversed. Address generator block 36 also provides timing and status information to data format block 38.

The task of data formatting consists of selecting the 8 consecutive bits from the 16 bit input data which correspond to the bit alignment of the frame sync pattern as detected by the appropriate correlator. If an inverted sync pattern was detected, bit inversion (0 to 1 and 1 to 0) is also performed by data format block 38. Similarly, if a reversed sync pattern was detected, the input bits are reversed in order so that the output data is in forward order. If derandomization is requested by the operator, the input data is combined with a pseudo-random sequence defined by the CCSDS recommendations using a Boolean exclusive OR function (XOR).

With continuing reference to FIG. 1, data format block 38 also provides a start pulse to Reed-Solomon (RS) decoding control block 40 while providing data to Reed-Solomon decoder blocks 42. Alternatively, RS code de-interleaving may be accomplished within a dual port RAM rather than by decoder blocks 42. This reduces memory requirements for variable interleaving but requires more complex address generation componentry. Preferably, correlators 30, threshold select block 32, frame sync block 34, RAM address generation block 36, data format block 38, and RS decoding block 42 are implemented utilizing field programmable gate arrays (FPGA's).

Preferably, RS decoder blocks 42 employ an interleave depth ranging between 1 and 5 for CCSDS applications. For other applications, the system provides for an interleave depth ranging from 1 to 8. The RS control block 40 provides timing signals to output format block 44 and the each of the RS decoders 42.

The RS decoders 42 include 5 identical decoders each running at 1/5 the parallel word rate (clock/8). RS decoding can also be accomplished using a single RS decoder and memory running at the parallel word rate. Input data is demultiplexed in a byte by byte fashion to each decoder in accordance with the CCSDS recommendations. Each decoder has the capability of correcting up to 16 byte errors in each 255 input block using the 32 check bytes present in the received data. The Reed-Solomon code, including field generator polynomial and code generator polynomial, are defined by the CCSDS specification. The RS decoders 42 output a status signal to output format block 44 to indicate that 5 blocks have been decoded. An indication is also sent from each decoder if uncorrectable data was detected, i.e. more than 16 byte errors occurred.

The CCSDS recommendation includes provisions for fill frames which are indicated by a predetermined bit pattern in the header information located after the frame sync pattern. A fill frame is utilized to maintain synchronization during periods when no data is being transmitted. As such, a fill frame does not contain useful information other than that required to maintain synchronization. The RS decoders 42 detects a fill frame pattern and sends this indication to output format block 44. Output data from RS decoders is re-multiplexed into a byte wide stream which is sent to time input and multiplexor (MUX) block 46.

Still referring to FIG. 1, output format block 44 schedules output of synchronized and corrected data. If any one of the RS decoders 42 detects uncorrectable data, or if a fill pattern is detected, the corresponding frame is discarded. Otherwise, the frame is output followed by a 9 byte time tag. Enable signals are then sent to time input and MUX block 46 which accepts data from RS decoders 42, appends external parallel time input data to each block, and outputs the result to FIFO (first-in, first-out) block 48. Output format block 44 also provides an output signal to HIPPI control block 50 which controls HIPPI interface 52. HIPPI control block 50 provides initialization, timing, and synchronization signals to HIPPI interface 52.

The FIFO block 48 demultiplexes the byte wide input data into 32 bit wide words for transmission over HIPPI interface 52. Since the HIPPI interface is much faster (800 Mbps) than the highest data rate accommodated by the system, an entire frame is stored in FIFO block 48 prior to transmission. Output data from FIFO block 48 is then sent to HIPPI interface 52.

The HIPPI interface 52 conforms to the standard promulgated by the American National Standards Institute (ANSI) for a synchronous 25 MHz, 32 bit wide interface. Input data from FIFO block 48 is burst out at a 25 MHz rate during each HIPPI packet transmission. This interface is simplex (output only), with no input port to allow computer control or error retransmission. The device attached to this output must be able to sustain an input rate corresponding to the maximum system input rate.

Figure 2B:
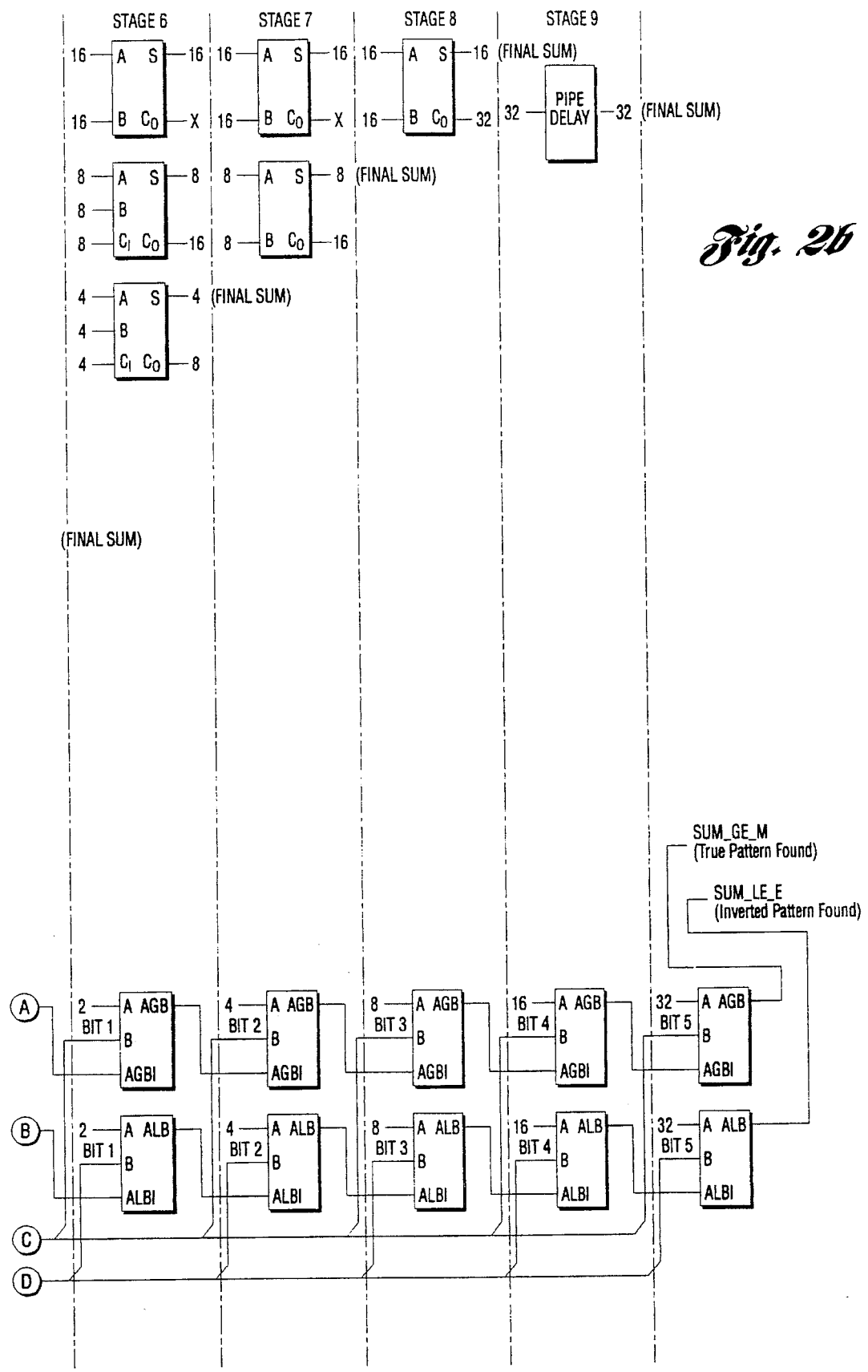

Referring now to FIGS. 2a and 2b, a block diagram of one of the correlators illustrated in FIG. 1 (block 30) is shown. Each correlator compares input data to the predetermined frame sync pattern and outputs a pulse if a selected number of bits in the pattern match the input data. As described above, each correlator has a designated 8-bit group contained within the 16 bit input from block 26 (of FIG. 1). Shift registers 60 are utilized to byte shift the 8-bit input data so as to produce a 32 bit wide data word. A Boolean XOR function is performed on corresponding bits of the data word and the frame sync pattern, with an inverted output by XNOR gates 62. Matching bits will produce a "high" signal at the output of the corresponding XNOR gate. The matches are summed to determine if a sufficient number of matches were present to indicate detection of the frame sync pattern. This number is determined by the Matches_Required input. If the sum equals or exceeds the matches required, SUM_GE_M output is set "high".

The same correlator also checks for "matches" against inverted data while substantially simultaneously checking for true data matches by comparing the sum to the Errors_Allowed input. The Errors_Allowed signal is generated by threshold select block 32 (shown in FIG. 1) and is equal to 32 minus the Matches_Required. If the sum is less than or equal to the Errors-Allowed, then SUM_LE_E output is set "high". This indicates an inverted frame sync pattern has been detected.

An eight-stage pipelined implementation of the correlators is used to meet the high speed demands of the system. Summing of the XNOR matches is pipelined over the eight stages. Stage 1 utilizes 10 full adders, such as full adder 64, and a single half-adder, such as half-adder 66, to sum the matches. The upper portion of Stage 2 sums all the 2's digit outputs from Stage 1, while the lower portion of Stage 2 sums all the 1's digit outputs from Stage 1. Likewise, the upper portion of Stage 3 sums all the 4's digit outputs from Stage 2, the middle portion of Stage 3 sums all the 2's digit outputs from Stage 2, and the lower portion of Stage 3 sums all the 1's digit outputs from Stage 2. The process continues propagating through the various stages until all six digits of the sum have been computed.

Still referring to FIG. 2, after Stage 4, the 1's digit of the final six-digit sum has been determined. This result is utilized in Stage 5 where it is compared to the 1's digit of the Matches_Required input by magnitude comparator 70. Substantially simultaneously, the result is compared to the 1's digit of the Errors_Allowed input by magnitude comparator 72. Similarly, each bit of the final sum is compared to the corresponding bit of Matches_Required and Errors_Allowed as it becomes available. Overlapping of the summing and comparison processes results in an overall reduction in the depth of the pipeline.

As also illustrated in FIG. 2, the upper portion of Stage 5 includes a delay element 74 to account for propagation delay and synchronize the state changes among the various adders. In Stages 6 and 7, the 32's digit bit is dropped from the sum, as indicated by the X's at the "carry-out" ($C_o$) output of the adders. It can be shown that these outputs will be "0" for all possible input combinations such that no information is lost by discarding them.

Figure 3:
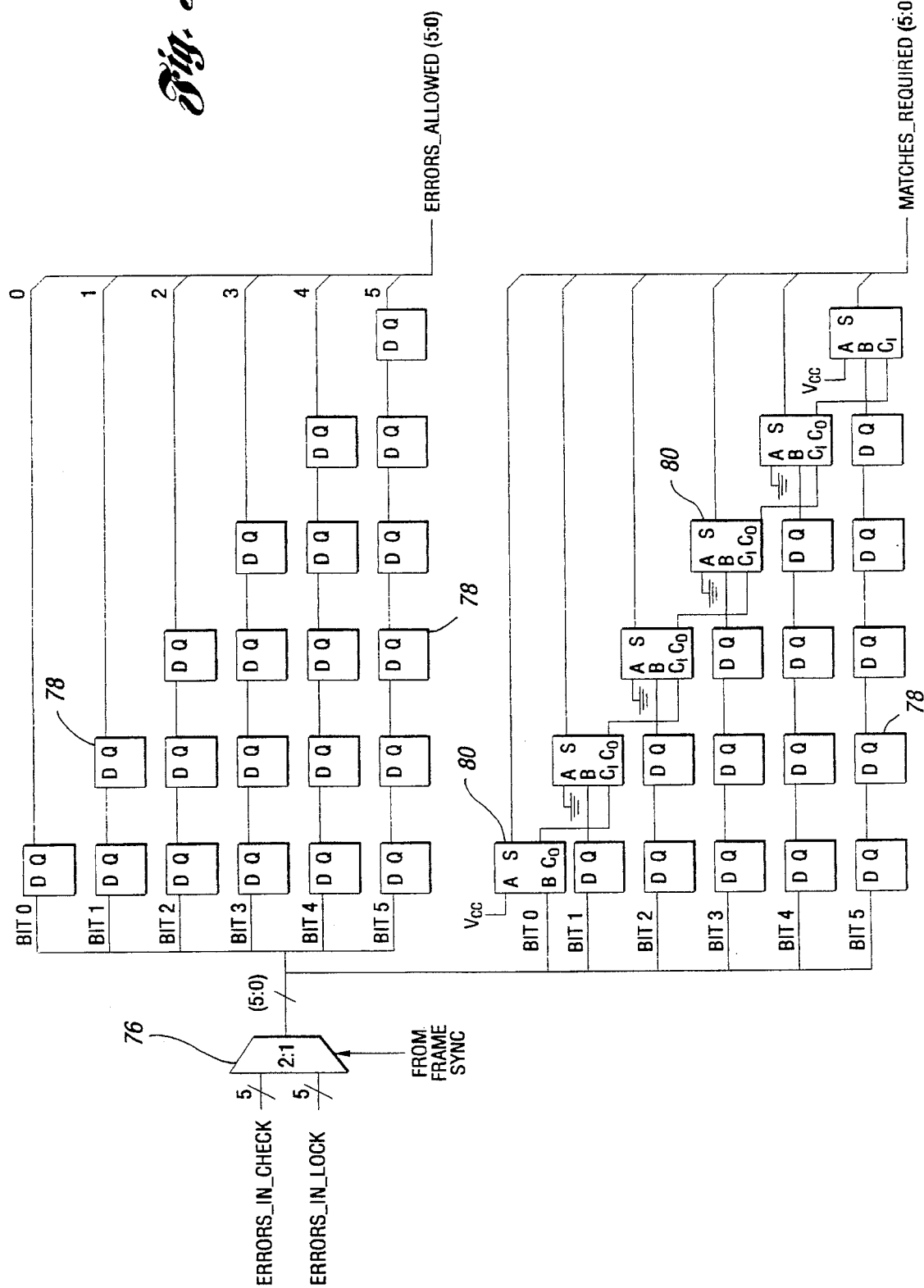
FIG. 3 is a block diagram illustrating the components of the threshold select block of the high speed parallel frame synchronizer of FIG. 1 according to the present invention.

Referring now to FIG. 3, a block diagram illustrating the components of the threshold select block of FIG. 1 (block 32) is shown. As previously discussed, the threshold select block generates the Errors_Allowed and Matches_Required values utilized by the correlators. The number of errors allowed depends on the current operating state of the system. Therefore, the 2:1 multiplexor 76 selects the appropriate value for the current state as indicated by the frame sync block (block 34 in FIG. 1). The data is staggered utilizing a series of "D" flip-flops 78 and adders 80 to match the pipelined implementation of the correlators. This assures a smooth transition when changing operating states from Check to Lock. Two's complement addition is used to assure that the value for Matches_Required equals 32 minus the value of Errors_Allowed.

Figure 4:
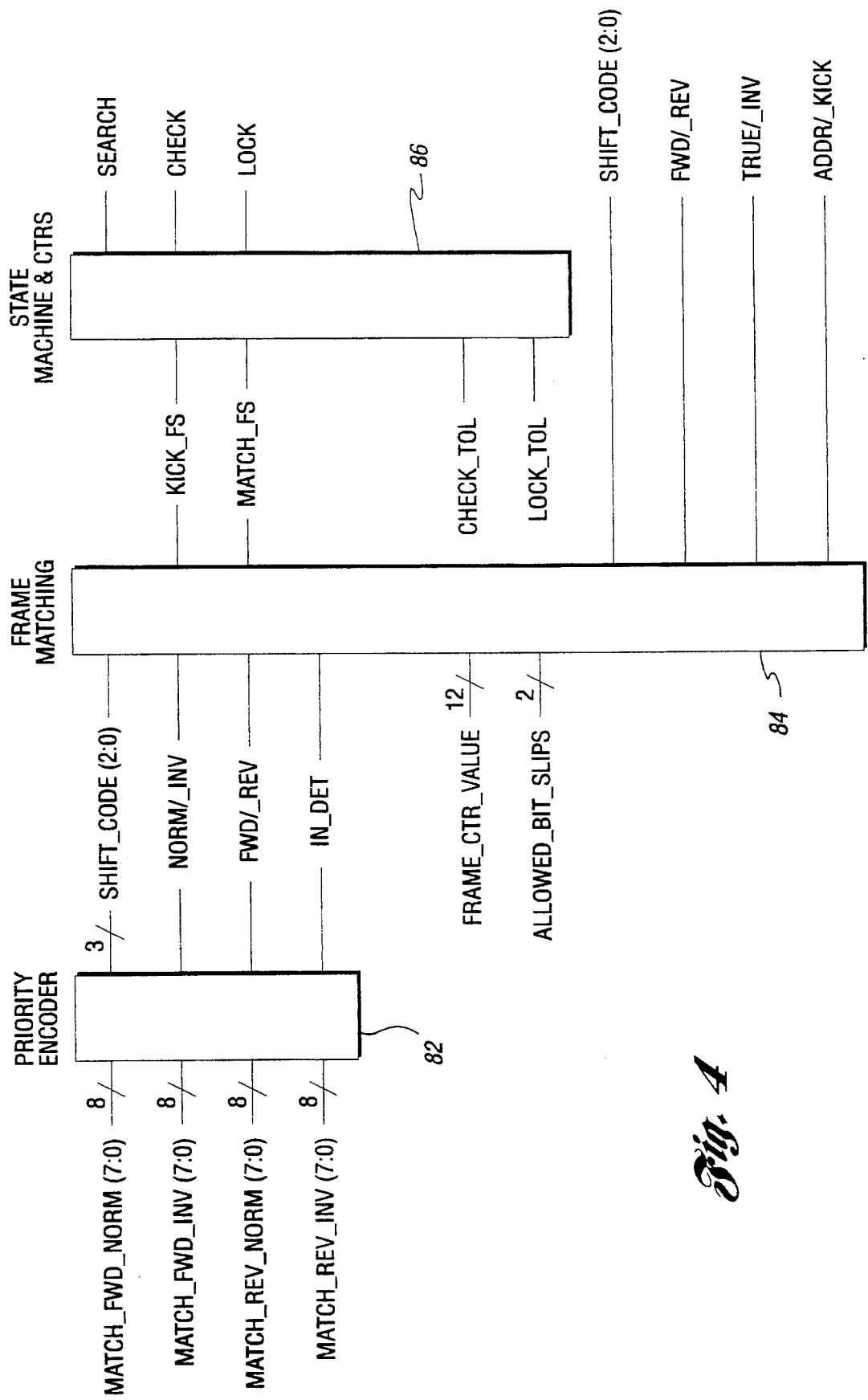
FIG. 4 is a block diagram illustrating the components of the frame sync block of the high speed parallel frame synchronizer of FIG. 1 according to the present invention.

Referring now to FIG. 4, a block diagram illustrating the components of the frame sync block of FIG. 1 (block 34) is shown. The frame sync block accepts pattern match signals from the correlators, priority encodes them, and looks for the repetition of the highest priority strobe one frame period later. As previously discussed, there are four operating states. While waiting for a match signal, the device is in the Search state. The first match signal forces the device to the Check state. The value of the Check_Tol input indicates how many successive frame match signals must be received before proceeding to the Lock state. The match signals must be consecutive and spaced one frame apart (within the bit slip tolerance as indicated by the Allowed_Bit_Slips). If the value of Check_Tol is "0", the device goes from Search, to Check, and on the next clock cycle, to Lock.

The device remains in Lock until a frame match signal is missed. If the value of Lock_Tol is 0, the device returns to the Search state. Otherwise, the operating state changes to Flywheel. Once in the Flywheel operating state, a received match signal forces the device back to the Lock state. If the number of missed frame signals exceeds the value of Lock_Tol, the device again enters the Search state. The state of the device is output to various other blocks to indicate when to start processing data.

As illustrated in FIG. 4, the frame sync block consists primarily of three sections. The first section includes priority encoder 82 which encodes the 32 inputs from the correlators. Outputs include a forward/reverse bit, a true/inverted bit, and three bits to indicate one of the eight bit shifts previously discussed. The priority scheme from highest to lowest is: forward true data, forward inverted data, reverse true data, and finally reverse inverted data. Within each category, a bit shift of 7 has the highest priority and a bit shift of 0, the lowest. If no signals are present, the 5-bit output indicates the lowest priority (reverse inverted data with a bit shift of 0). To differentiate this default state from actually receiving the lowest priority signal, an additional output bit (In_Det) is provided which is "high" when any input signal is detected.

The second section includes frame matcher 84 which takes the 5-bit priority encoded result from encoder 82 and compares it to the previous result of one frame earlier. Timing of the comparison is controlled by a frame counter (not specifically illustrated) connected to Frame_Ctr_Value input. If the results match or are within the number of allowed bit slips, the Kick_FS and Match_FS signals are generated. If the results are not within the number of allowed bit slips, or if no code was received, only the Kick_FS output is generated.

Still referring to FIG. 4, it is possible when bit slips are allowed, that the desired frame code may be one clock cycle earlier or later than expected. Frame matcher 84 checks for this condition and uses the early or late code if no sync pattern match is found where anticipated. The frame counter is accordingly restarted one clock cycle earlier or later to adjust for the bit slips. Various frame sizes may be accommodated by changing the Frame_Ctr_Value which is loaded into the frame counter. Every time the frame counter is reloaded while not in the Search state, the Addr_Kick output is strobed to cause the address generation block to start reading frame data out of memory, as explained in greater detail below.

The third section of the frame sync block illustrated in FIG. 4 includes state machine 86 and two counters. The first Kick_FS signal forces the state machine into the Check state. The Check counter is then preset to the Check_Tol value. Successive simultaneous Kick_FS and Match_FS strobes while in the Check state cause the counter to count down until it reaches zero. Once the counter reaches zero, the operating state changes from Check to Lock and the Lock counter is preset to the Lock_Tol value. Any time thereafter when a Kick_FS occurs without an accompanying Match_FS, the counter is decremented and the operating state changes to the Flywheel state. Once the counter reaches zero, the next Kick_FS without a Match_FS will force state machine 86 back to the Search state. Receipt of a Kick_FS and a Match_FS while in the Flywheel state presets the Lock counter to the Lock_Tol value and the Lock state is re-entered.

Figure 5:
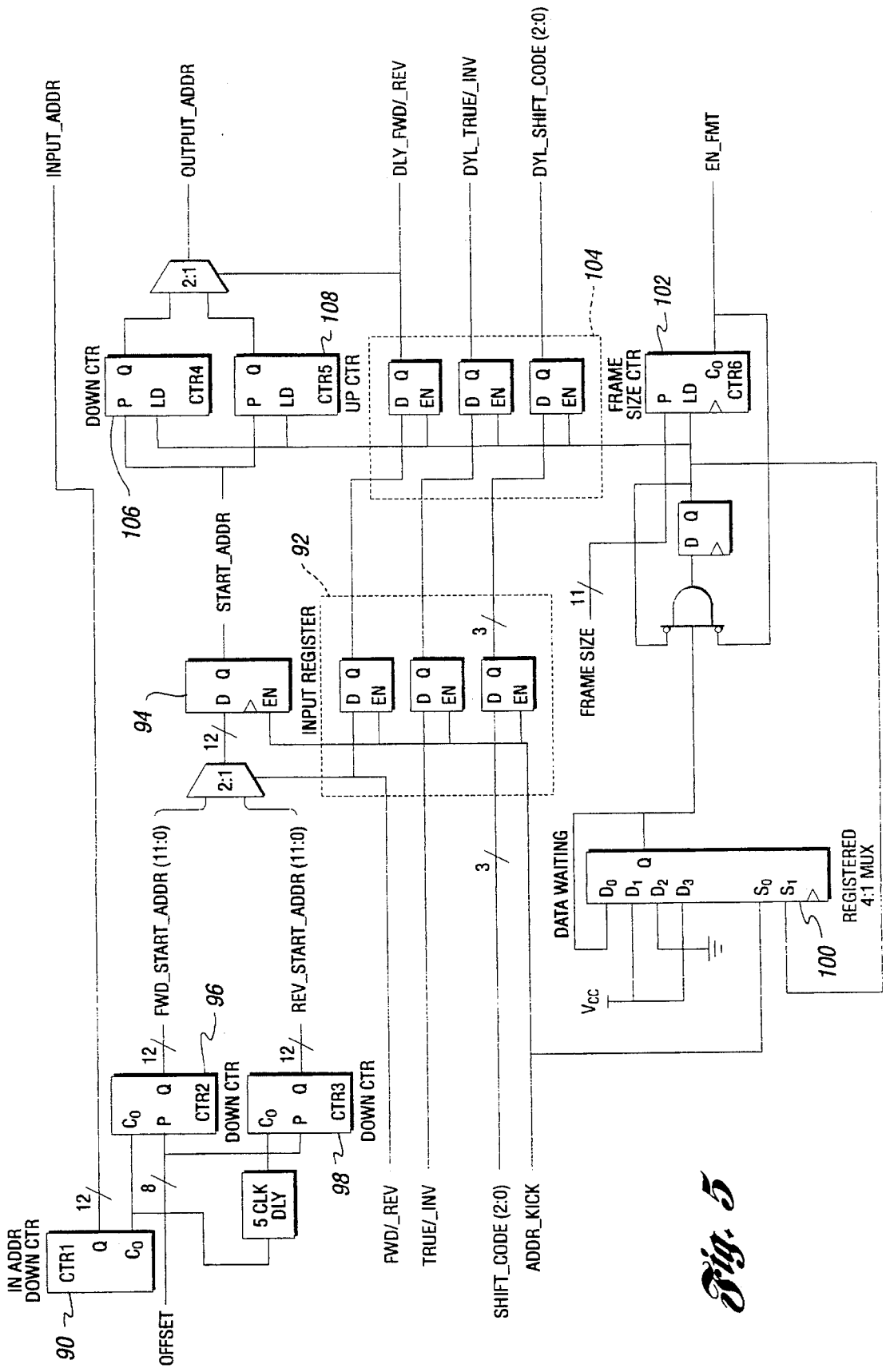
FIG. 5 is a block diagram illustrating the components of the address generation block of the high speed parallel frame synchronizer of FIG. 1 according to the present invention.

Referring now to FIG. 5, a block diagram illustrating the components of the address generation block of FIG. 1 (block 36) is shown. This block generates addresses which are supplied to the input side of dual port RAM (block 28 of FIG. 1) as 16-bit input frame data is received. The address generation block also determines the start address of a frame and generates addresses to the output side of the dual port RAM to read out data one frame at a time. The output addresses will either decrement or increment depending on whether the frame data was received in forward or reverse order, respectively. Since it is not necessary to read out the frame sync pattern, the start addresses for forward data will be offset by five locations from the addresses for reverse data.

Still referring to FIG. 5, an 11-bit down counter 90 (CTR1) runs continuously while the system is operating to generate the input addresses. An Addr_Kick strobe causes the 5-bit data field from the frame sync block to be latched into an input register 92. The strobe also causes the appropriate Start_Address to be latched by flip-flop 94, depending upon the state of the forward/reverse bit of the data field. Since the system design uses a pipelined implementation, the start address for reading out data will be a fixed offset from the input address at the time the Addr_Kick strobe is received. The start address for forward data runs at an externally programmed offset from down counter 90 and is generated by down counter 96 (CTR2). The start address for reverse data is generated by counter 98 (CTR3) and runs five counts behind down counter 96.

When input register 92 is loaded and the start address has been latched by flip-flop 94, data waiting flip-flop 100 is set active. The state of input register 92, flip-flop 94 and flip-flop 100 is maintained until a frame size counter 102 (CTR6) counts down to zero indicating that the previous frame has been read out of the dual port RAM. When the $C_o$ output of counter 102 goes to a "low" state, a data waiting signal is communicated.

The data waiting signal is operative to reload frame size counter 102 and load a hold register 104 with the contents of input register 92. The data waiting signal also loads a forward address generator counter 106 (CTR4) and a reverse address generator counter 108 (CTR5) with the start address. Counter 106 is a down counter while counter 108 is an up counter. The forward/reverse bit of hold register 104 determines which counter drives the output address lines. The En_Fmt signal from counter 102 and the contents of hold register 104 are provided to the data format block (block 38 of FIG. 1) to indicate the necessary formatting as data is received from the dual port RAM. Data formatting may include reversing bit order, inverting bits, and bit shifting.

Referring now to FIG. 6, a block diagram illustrating the components of the data formatting block of FIG. 1 (block 38) is shown. The data formatting block accepts 16-bit data from the output side of the dual port RAM (block 28 of FIG. 1) and a 5-bit input from the RAM address generator (block 36 of FIG. 1) which indicates the appropriate data formatting to be performed. Three bits of the 5-bit code indicate the appropriate bit shift, while a forward/reverse bit and a true/invert bit indicate the type of data being received. The forward true data that results from this formatting can be XORed with a PN code generated internally in the device. The PN coding is enabled by applying a "low" signal to the PN_DISABLE input.

The 16-bit data is input to the byte shift multiplexor 110 which selects the appropriate byte depending on the value of the Dly_Shft_Code input. The output data is then bit reversed by reverser 112 if the Dly_Fwd/_Rev input is "low". The output of reverser 112 is inverted by XNOR gates 114 if the Dly_True/_Inv input is "low". The result passes through XOR gates 116 where it is combined with a PN code if the PN_Disable input is low. The data output is then communicated to the RS decoders (block 42 of FIG. 1).

As is well known in the art, PN codes are utilized to "randomize" data so as to provide a sufficient number of state transitions (between high and low or "0" and "1") for detection. This prevents losing a lock on the received data due to a protracted sequence of a single state. Typically, PN codes are generated in a serial fashion by combining selected outputs of a shift register and feeding the result back to form the input of that shift register. Since the data words are already in a parallel format in the present invention, a parallel implementation was developed to generate the PN code.

Furthermore, as illustrated in FIG. 6, two parallel PN generators 118 and 120 are utilized in combination to provide high speed operation. Multiplexors 122 alternately select the output from either generator 118 or generator 120. By updating the output of each generator every other clock cycle, sufficient time is available for the outputs to propagate through the feedback paths to the inputs. The feedback equations for the parallel generator were derived by stepping a serial PN generator through 16 clock cycles. Derivation of equations for a non-multiplexed parallel generator would require only 8 steps through a serial generator, thus the demultiplexed-by-two approach requires 16 steps through a serial generator. The parallel PN code pattern repeats every 255 bytes. The PN generators are reinitialized, each with a unique value, at the start of each code block when the En_Fmt input transitions from "low" to "high". The En_Fmt line stays "high" during the time that valid data is being delivered to the data formatting block. A delayed version of this signal is fed to the RS decoding block indicating valid data out of the data formatting block.

The system design provides for a number of possible enhancements and adaptations particularly suited to various applications. The input data stream could easily be provided by a number of other input interfaces, such as a fiber optic interface or non-return-to-zero (NRZ) ECL data only (no clock). Higher data rates may be accommodated through higher speed serial to parallel conversion and/or utilizing wider data paths throughout the system. Test pattern generation capability could also be provided for built-in test capability.

Likewise, various output interfaces may be provided, such as a fiber optic channel or parallel strobe and data, either synchronous or with asynchronous handshaking. The system design also easily accommodates various remote control and status interfaces, such as VME bus, RS-232, Ethernet, and the like, so as to allow user control. User control may include defining parameters such as sync pattern, allowable bit slips, and lock tolerance, among others. In addition, user control may be utilized to define the operating states in which data is to be read out of the dual port RAM, such as Lock and Flywheel; Lock only; or Check, Lock, and Flywheel.

The flexibility of the high speed parallel frame synchronizer is easily adaptable to accommodate a variety of frame formats. In addition to standard (32-bit compatible with "virtual fill") CCSDS frame formats, Grade 3 CCSDS format, which provides error correction of the header field but not the data field, is also accommodated. Furthermore, non-CCSDS frame sync patterns, frame formats, and frame lengths such as Intelsat may be accommodated.

It is understood, of course, that while the form of the invention herein shown and described includes the best mode contemplated for carrying out the invention, it is not intended to illustrate all possible forms thereof. It will also be understood that the words used are descriptive rather than limiting, and that various changes may be made without departing from the spirit and scope of the invention disclosed.

What is claimed is:

1. A method of detecting synchronizing to high speed serial true and inverted data capture by detecting a predetermined frame synchronization pattern within a received digital signal characterized by a serial bit stream, wherein a predetermined number of consecutive bits in the serial bit stream is converted to a parallel data word as the digital signal is received, the method comprising:

substantially simultaneously comparing each parallel data word with a plurality of predetermined parallel bit patterns, each bit pattern of the plurality of predetermined parallel bit patterns corresponding to a different representation of the frame synchronization pattern; so as to characterize the digital signal being received and to determine a position of the frame synchronization pattern within the parallel data word, the digital signal being characterized as being one of the members of the group consisting of true forward, true reverse, inverted forward, and inverted reverse, wherein true forward is indicative of a forward-ordered, non-inverted bit sequences, true reverse is indicative of a reverse-ordered, non-inverted bit sequence, inverted forward is indicative of a forward-ordered, inverted bit sequence and inverted reverse is indicative of a reverse-ordered, inverted bit sequence;

generating a correlation signal for each substantially simultaneous comparison to indicate a degree of correlation between each of the plurality of predetermined parallel bit patterns and at least a portion of the parallel data word; and selecting one of the correlation signals which has a degree of correlation greater than a predetermined minimum degree of correlation so as to detect the predetermined frame synchronization pattern.

2. The method of claim 1 wherein selecting one of the correlation signals comprises selecting a first received correlation signal with a degree of correlation greater than a predetermined minimum degree of correlation.

3. The method of claim 1 wherein a plurality of correlation signals are received simultaneously and wherein selecting one of the correlation signals comprises selecting one of the correlation signals according to a predetermined priority scheme.

4. The method of claim 1 further comprising storing the parallel data words in a memory so as to allow selective formatting of the parallel data words, the formatting being selected based on the characterization of the digital signal.

5. The method of claim 1 further comprising:

storing the parallel data words in a memory so as to allow selective formatting of the parallel data words, the formatting being selected based on the characterization of the digital signal; and formatting the parallel data words so as to produce data words characterized as true forward.

6. The method of claim 5 wherein formatting the parallel data words includes retrieving the parallel data words from the memory in a sequence based upon the characterization of the digital signal so as to produce a forward ordered sequence of parallel data words.

7. The method of claim 5 wherein formatting the parallel data words includes reversing the sequence of the bits within each parallel data word.

8. The method of claim 5 wherein formatting the parallel data words includes inverting the bits within each parallel data word.

9. The method of claim 1 wherein the received digital signal is coded to induce a minimum number of state transitions to enhance signal detection, the method further comprising:

generating a plurality of parallel decoding patterns for decoding a corresponding sequence of parallel data words;

alternately selecting each of the plurality of parallel decoding patterns; and combining the selected parallel decoding pattern with the corresponding parallel data word to decode the received digital signal.

10. The method of claim 9 further comprising repeating the steps of generating, selecting, and combining indefinitely while the digital signal is being received.

11. The method of claim 9 wherein generating a plurality of parallel decoding patterns includes, for each decoding pattern, linking outputs of a pattern generator with selected inputs of the pattern generator; and maintaining a current output state for a sufficient time to allow signals to propagate from the outputs of the pattern generator to the inputs of the pattern generator.

12. A system for detecting synchronizing to high speed serial true and inverted data capture by detecting a predetermined frame synchronization pattern within a received digital signal characterized by a serial bit stream, wherein a predetermined number of consecutive bits in the serial bit stream is converted to a parallel data word as the digital signal is received, the system comprising:

- means for substantially simultaneously comparing each parallel data word with a plurality of predetermined parallel bit patterns, each bit pattern of the plurality of predetermined parallel bit patterns corresponding to a different representation of the frame synchronization pattern; so as to characterize the digital signal being received and to determine a position of the frame synchronization pattern within the parallel data word, the digital signal being characterized as being one of the members of the group consisting of true forward, true reverse, inverted forward, and inverted reverse, wherein true forward is indicative of a forward-ordered, non-inverted bit sequences, true reverse is indicative of a reverse-ordered, non-inverted bit sequence, inverted forward is indicative of a forward-ordered, inverted bit sequence and inverted reverse is indicative of a reverse-ordered, inverted bit sequence;
- means for generating a correlation signal for each substantially simultaneous comparison to indicate a degree of correlation between each of the plurality of predetermined parallel bit patterns and at least a portion of the parallel data word; and
- means for selecting one of the correlation signals which has a degree of correlation greater than a predetermined minimum degree of correlation so as to detect the predetermined frame synchronization pattern.

13. The system of claim 12 wherein the means for selecting one of the correlation signals comprises means for selecting a first received correlation signal with a degree of correlation greater than a predetermined minimum degree of correlation.

14. The system of claim 12 wherein a plurality of correlation signals are received simultaneously and wherein the means for selecting one of the correlation signals comprises means for determining priority among the correlation signals and selecting the correlation signal with a highest priority.

15. The system of claim 12 further comprising a memory for storing the parallel data word so as to allow selective formatting of the parallel data word, the formatting being selected based on the characterization of the digital signal.

16. The system of claim 15 further comprising:

- means for formatting the parallel data word so as to produce data words characterized as true forward.

17. The system of claim 16 wherein the means for formatting the parallel data word comprises:

- means for retrieving the parallel data word from the memory in a selective sequence based upon the characterization of the digital signal;
- means for selectively reversing the sequence of bits within each parallel data word based on the characterization of the digital signal; and
- means for selectively inverting each bit of each parallel data word based on the characterization of the digital signal.

18. The system of claim 12 wherein the received digital signal is coded to induce a minimum number of state transitions to enhance signal detection, the system further comprising:

- means for generating a plurality of parallel decoding patterns for decoding a corresponding sequence of parallel data words;
- means for alternately selecting each of the plurality of parallel decoding patterns; and
- means for combining the selected parallel decoding pattern with a corresponding parallel data word to decode the received digital signal.

* * * * *